United States Patent
Yang et al.

(10) Patent No.: US 8,154,233 B2
(45) Date of Patent: Apr. 10, 2012

(54) SENSORLESS METHOD AND RELATED DEVICE FOR STARTING A THREE-PHASE BRUSHLESS DIRECT-CURRENT MOTOR

(75) Inventors: Chia-Tai Yang, Tainan (TW); Ching-Sheng Li, Hsinchu County (TW); Kun-Min Chen, Changhua County (TW); Tzu-Cheng Teng, Taipei (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 593 days.

(21) Appl. No.: 12/327,814

(22) Filed: Dec. 4, 2008

(65) Prior Publication Data

US 2010/0090631 A1    Apr. 15, 2010

(30) Foreign Application Priority Data

Oct. 15, 2008   (TW) ............................... 97139499 A

(51) Int. Cl.
*H02P 6/04*   (2006.01)
(52) U.S. Cl. .................... 318/400.11; 318/459
(58) Field of Classification Search ............. 318/400.11, 318/400.32, 400.34, 400.35, 459, 500
See application file for complete search history.

(56) References Cited

U.S. PATENT DOCUMENTS

| | | | | |
|---|---|---|---|---|
| 5,198,733 A | * | 3/1993 | Wright | 318/400.34 |
| 5,233,275 A | * | 8/1993 | Danino | 318/400.35 |
| 5,397,971 A | * | 3/1995 | McAllister et al. | 318/400.35 |
| 5,726,543 A | * | 3/1998 | Park et al. | 318/400.11 |
| 6,181,093 B1 | * | 1/2001 | Park et al. | 318/400.34 |
| 7,071,640 B2 | * | 7/2006 | Kurosawa et al. | 318/400.04 |

* cited by examiner

*Primary Examiner* — Rina Duda
(74) *Attorney, Agent, or Firm* — Winston Hsu; Scott Margo

(57) ABSTRACT

A sensorless method for starting a three-phase brushless direct-current motor includes generating a start-up control signal, a start mode selection signal, and a control signal commutation period; switching to a start mode according to the start mode selection signal; implementing a position aligning procedure according to the start-up control signal and the control signal commutation period; detecting a zero crossing point of back electromotive forces during each control signal commutation period; outputting a sensorless mode selection signal while detecting the zero crossing points of the back electromotive forces during consecutive control signal commutation periods; switching to a sensorless mode according to the sensorless mode selection signal; and detecting a zero crossing point of back electromotive forces in the sensorless mode to determine a starting result of the three-phase brushless direct-current motor.

17 Claims, 11 Drawing Sheets

SENSORLESS METHOD AND RELATED DEVICE FOR STARTING A THREE-PHASE BRUSHLESS DIRECT-CURRENT MOTOR

BACKGROUND OF THE INVENTION

1. Field of the Invention

The present invention relates to a sensorless method and related device for starting a three-phase brushless direct-current motor, and more particularly, to a sensorless method and related device capable of enhancing probability of successfully starting the three-phase brushless direct-current motor without a synchronization procedure.

2. Description of the Prior Art

Nowadays, brushless direct-current motors are widely used, and have several advantages, including small size, light weight, simplicity of design, and efficiency. Brushless direct-current motors are often utilized for fan motors, and spindle motors of storage apparatuses in electronic devices, such as personal computers, notebooks, communication devices, and home appliances. Generally speaking, position of a rotor needs to be detected while driving the brushless direct-current motors in order to drive a switch for commutation procedures.

Please refer to FIG. 1. FIG. 1 is a schematic diagram of a brushless direct-current motor system 10 in the prior art. The brushless direct-current motor system 10 includes a three phase brushless direct-current motor 102, a Hall sensor 104, and a driver 106. The three phase brushless direct-current motor 102 includes a rotor 108. The Hall sensor 104 has three Hall elements 110, 112, 114 for sensing position of the rotor 108. The driver 106 includes a logic unit 116 and a commutation switch 118. The logic unit 116 transmits a control signal to the commutation switch 118 according to the position of the rotor 108 detected by the Hall sensor 104 so as to drive the rotor 108. However, sensing accuracy of the Hall sensor 104 is easily affected by surroundings, even such that the Hall sensor 104 can not work in some environments (such as high temperature environments). On the other hand, the Hall sensor 104 may increase system volume and manufacturing cost of the brushless direct-current motor system 10. Therefore, a sensorless driving method without a sensor is introduced.

Please refer to FIG. 2 and FIG. 3. FIG. 2 is an equivalent circuit diagram of the brushless direct-current motor system 10 shown in FIG. 1. FIG. 3 is a driving time sequence diagram of the brushless direct-current motor system 10 shown in FIG. 1. T1, T2, T3, T4, T5, and T6 respectively represent time sequence of each switch of the commutation switch 118. As shown in FIG. 2 and FIG. 3, driving order for the switch 118 is 1-6, 1-2, 3-2, 3-4, 5-4, 5-6 in turn. Two phases are conducted and a third phase is floating, and Va, Vb, and Vc are corresponding voltage levels respectively, so that back electromotive force of the three phase brushless direct-current motor 102 can be detected through the floating third phase. As a result, position information of the rotor 108 is obtained by detecting a zero crossing point Z of the back electromotive force. Nevertheless, using the sensorless method, the back electromotive force of the three phase brushless direct-current motor 102 cannot be effectively detected at a low rotational speed or in a static state, and the position of the rotor also can not be obtained accurately, so that the driver 106 can generate a control signal to drive the three phase brushless direct-current motor 102. To alleviate the abovementioned problem, a starting mode must be added in the sensorless method for the rotor 108 to reach a specific speed so as to detect the zero crossing point of the back electromotive force accurately and generate the control signal for driving the motor. Please refer to FIG. 4. FIG. 4 is a schematic diagram of a starting procedure 40 of the brushless direct-current motor system 10 in the prior art. The starting procedure 40 comprises the following steps:

Step 400: Start.

Step 402: Set an initial control signal and an initial speed.

Step 404: Determine whether a synchronization time has passed. If yes, go to Step 406; otherwise, implement Step 404 again.

Step 406: Determine a synchronizing speed. When the synchronizing speed is greater than a predetermined speed, go to Step 410; otherwise, go to Step 408.

Step 408: Commutate a control signal of the brushless direct-current motor system 10, and increase the synchronizing speed.

Step 410: Switch the brushless direct-current motor system 10 to a sensorless mode.

Step 412: Detect the zero crossing point Z of the back electromotive force in order to determine a starting result.

Step 414: End.

According to the procedure 40, the prior art sets an initial control signal and an initial speed to accelerate the rotor of the brushless direct-current motor system 10. Then, it is determined whether the synchronization time has passed and the synchronizing speed is greater than the predetermined speed in order to decide to switch to the sensorless mode. Again, if no zero crossing point Z of the back electromotive force is detected, there is a starting failure, and the brushless direct-current motor system 10 must re-implement the starting procedure. However, the abovementioned starting method is unable to predict initial position of the rotor in practice. If the rotor and the initial control signal produce zero torque, i.e. magnetic field of a stator is oriented 0 degrees or 180 degrees with magnetic field of the rotor in the brushless direct-current motor, this will make the rotor unable to accelerate to the predetermined speed after the synchronization time has passed, and increases the possibility that no zero crossing point of the back electromotive force is detected after switching to the sensorless mode, causing starting procedure failure.

SUMMARY OF THE INVENTION

It is therefore one of the objectives of the present invention to provide a sensorless method and related device for starting a three-phase brushless direct-current motor.

The present invention discloses a sensorless method for starting a three-phase brushless direct-current motor, which comprises generating a start-up control signal, a start mode selection signal, and a control signal commutation period; switching to a start mode according to the start mode selection signal; implementing a position aligning procedure according to the start-up control signal and the control signal commutation period; detecting a zero crossing point of back electromotive forces during each control signal commutation period; outputting a sensorless mode selection signal while detecting the zero crossing points of the back electromotive forces during consecutive control signal commutation periods; switching to a sensorless mode according to the sensorless mode selection signal; and detecting a zero crossing point of back electromotive forces in the sensorless mode to determine a starting result of the three-phase brushless direct-current motor.

The present invention further discloses a sensorless device for starting a three-phase brushless direct-current motor, which comprises a starting unit, a driving unit, a floating node selection unit, a back electromotive force detection unit, and a control unit. The starting unit is utilized for generating a start-up control signal, a start mode selection signal, and a control signal commutation period. The driving unit is coupled to the starting unit and the three-phase brushless direct-current motor for switching an operating mode of the three-phase brushless direct-current motor, implementing a position aligning procedure, and driving the three-phase brushless direct-current motor according to the start-up control signal, the start mode selection signal, and the control signal commutation period. The floating node selection unit is coupled to the driving unit and the three-phase brushless direct-current motor for selecting a third phase not inducted in the three-phase brushless direct-current motor according to state of the driving unit. The back electromotive force detection unit is coupled to the floating node selection unit for detecting back electromotive forces of the three-phase brushless direct-current motor. The control unit is coupled to the driving unit and the back electromotive force detection unit for outputting a sensorless mode selection signal or a commutation signal to the driving unit according to a detection result of the back electromotive force detection unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
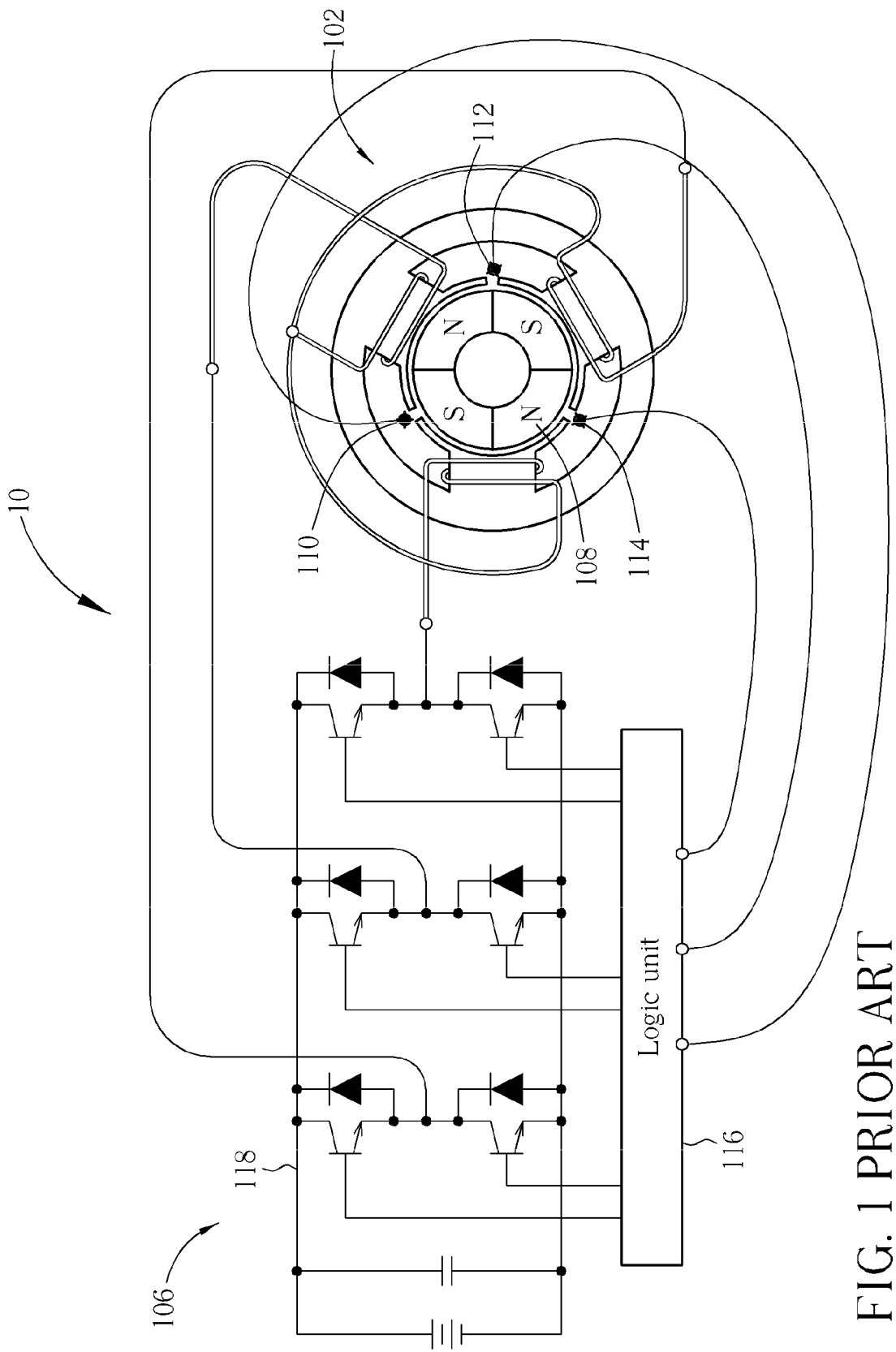
FIG. 1 is a schematic diagram of a brushless direct-current motor system in the prior art.
Figure 2:
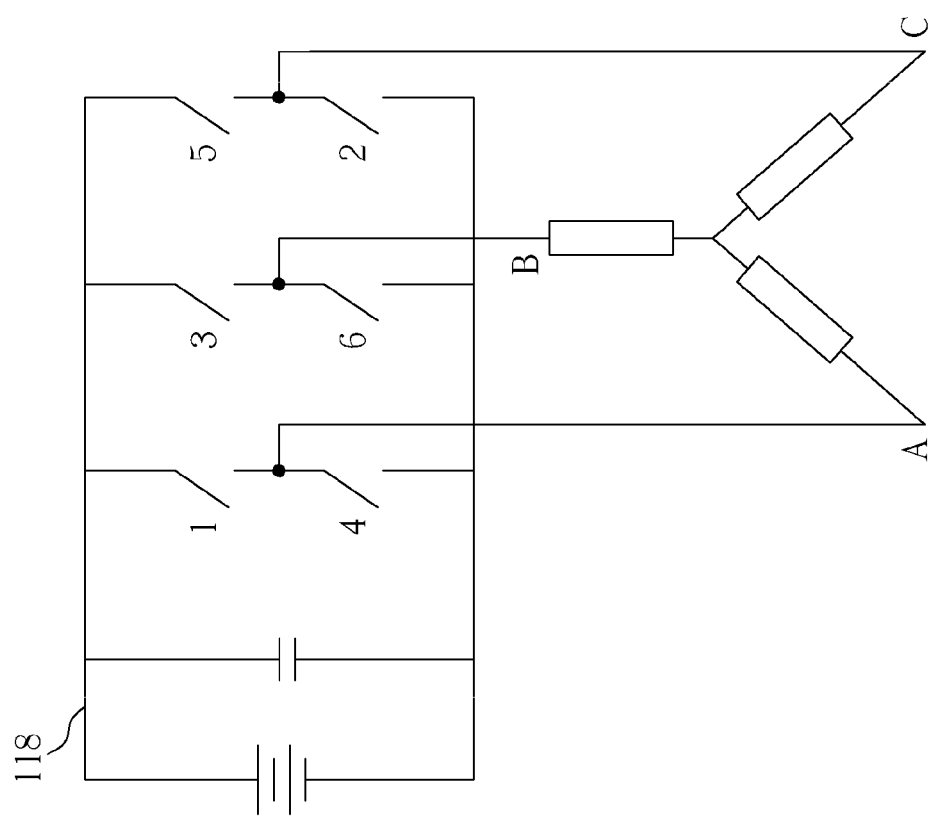
FIG. 2 is an equivalent circuit diagram of the brushless direct-current motor system shown in FIG. 1.
Figure 3:
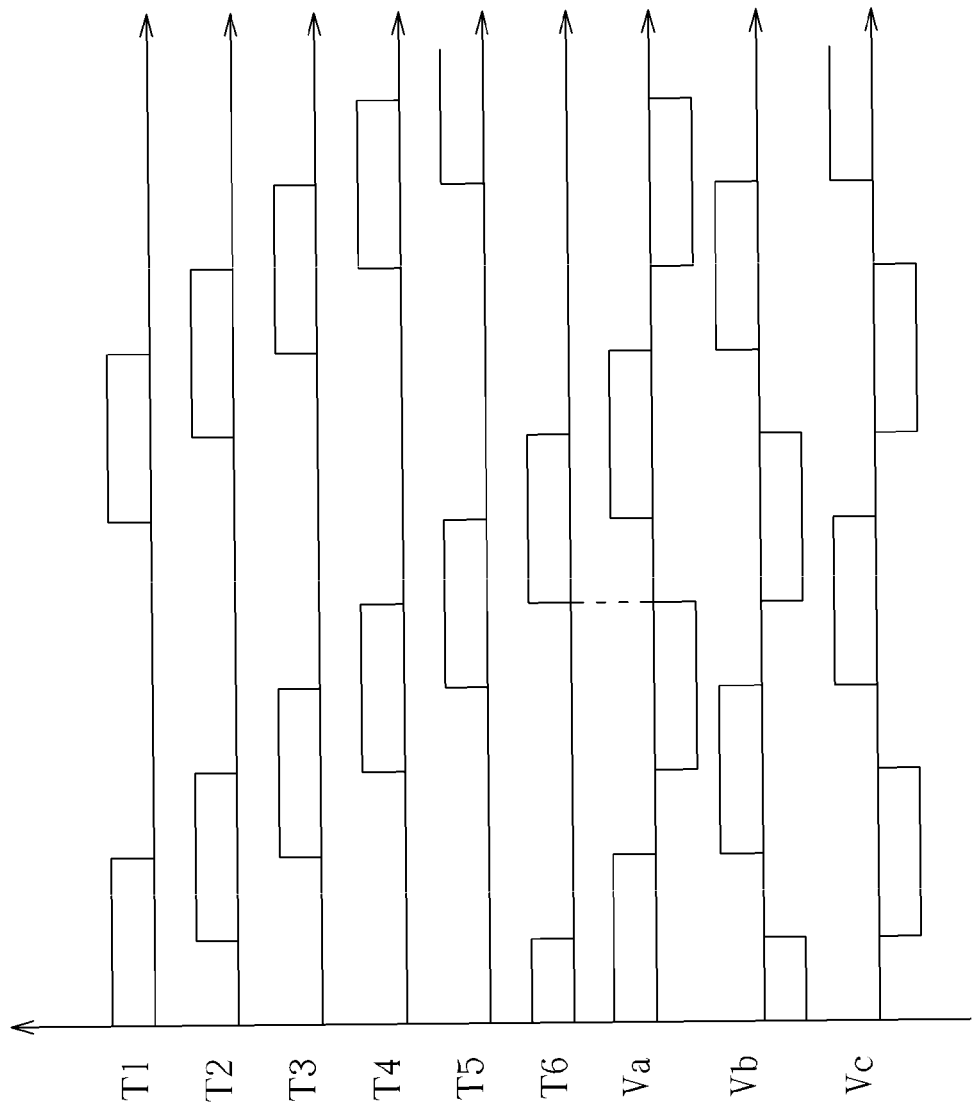
FIG. 3 is a driving time sequence diagram of the brushless direct-current motor system shown in FIG. 1.
Figure 4:
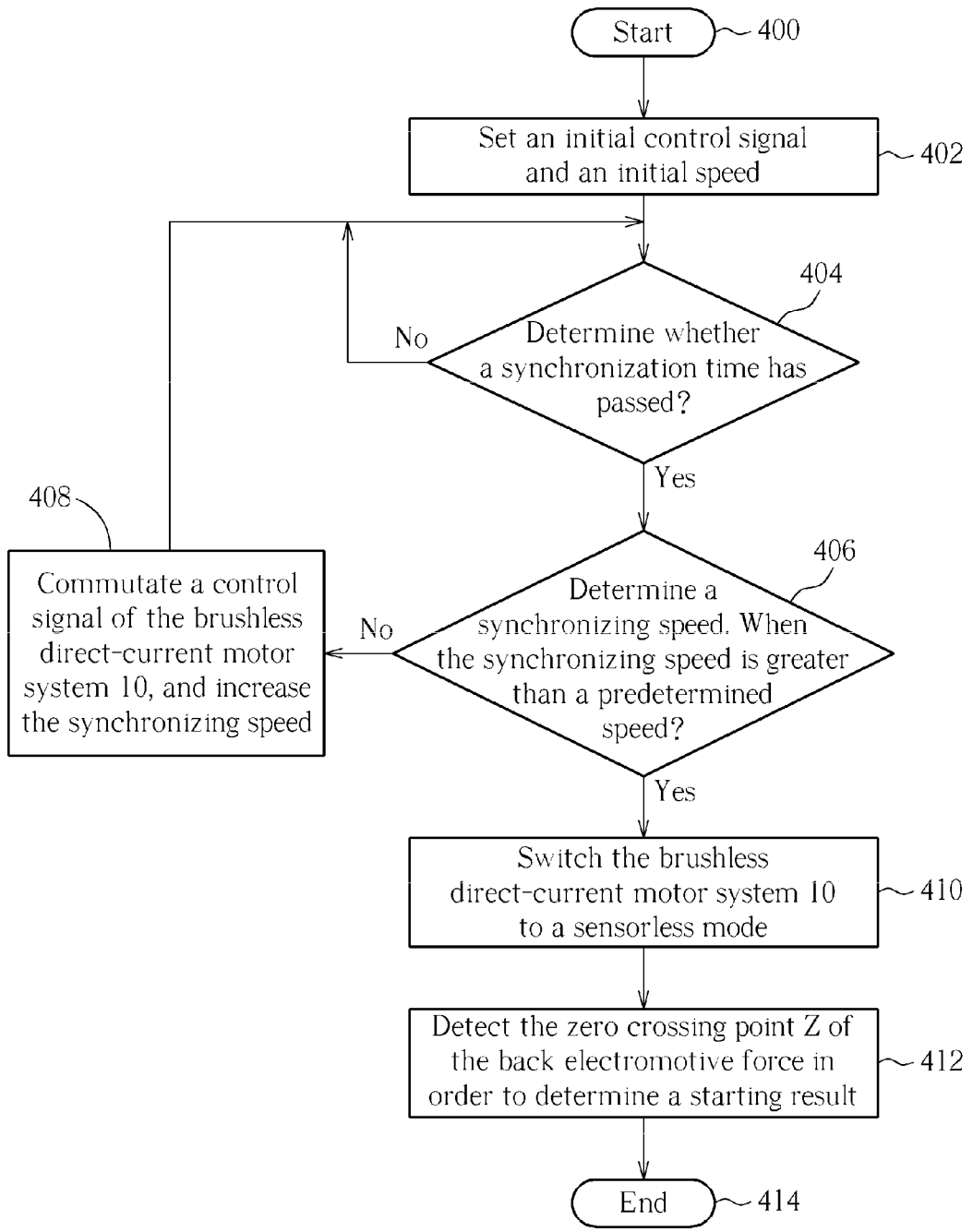
FIG. 4 is a schematic diagram of a starting procedure of the brushless direct-current motor system 10 in the prior art.
Figure 5:
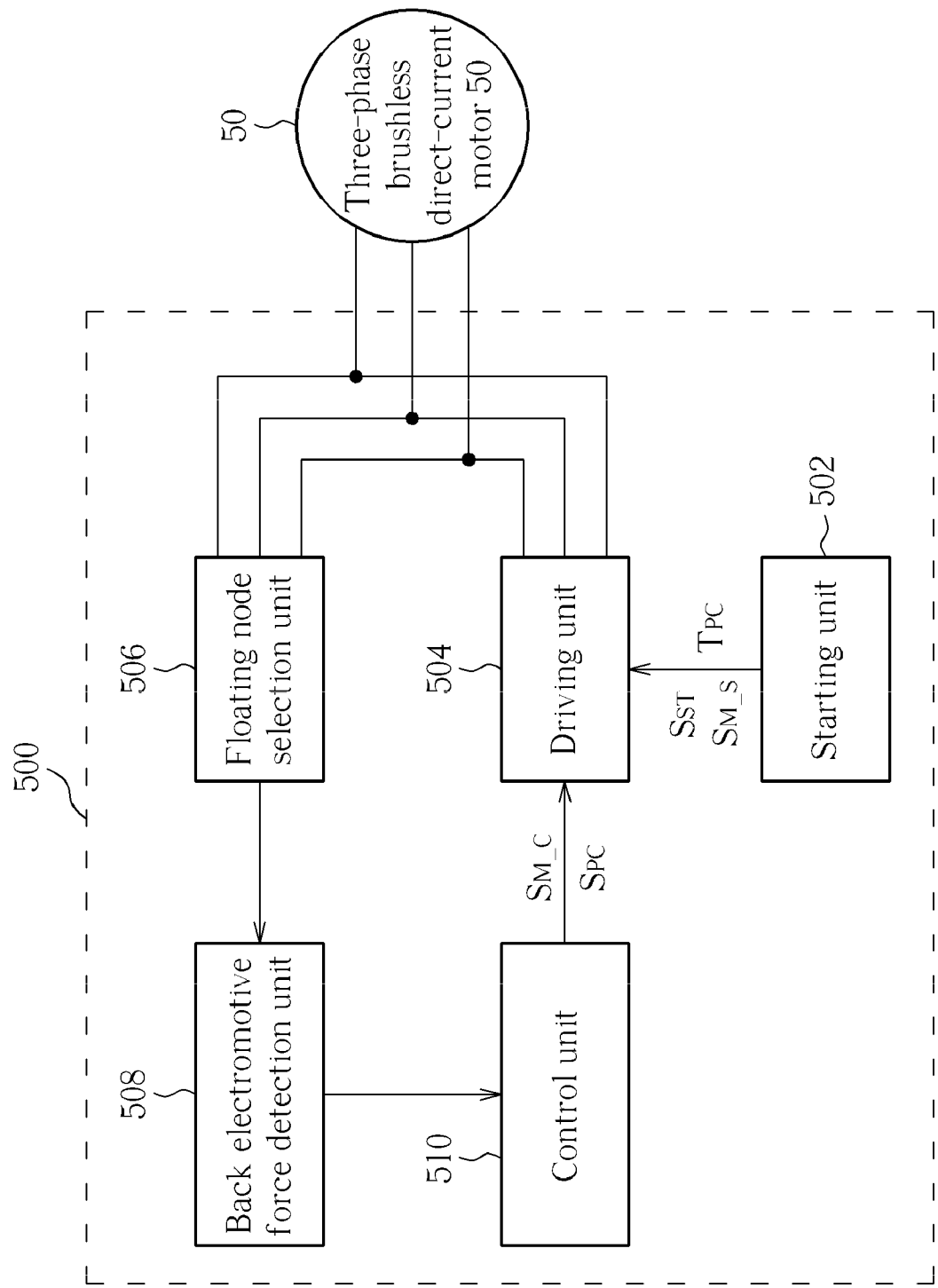
FIG. 5 is a schematic diagram of a sensorless device of a three-phase brushless direct-current motor according to an embodiment of the present invention.

Please refer to FIG. 5. FIG. 5 is a schematic diagram of a sensorless device 500 of a three-phase brushless direct-current motor 50 according to an embodiment of the present invention. The sensorless device 500 is utilized for starting the three-phase brushless direct-current motor 50. The sensorless device 500 includes a starting unit 502, a driving unit 504, a floating node selection unit 506, a back electromotive force detection unit 508, and a control unit 510. The starting unit 502 is utilized for generating a start-up control signal $S_{ST}$, a start mode selection signal $S_{M\_S}$ and a control signal commutation period $T_{PC}$. The driving unit 504 is coupled to the starting unit 502 and the three-phase brushless direct-current motor 50 for switching an operating mode of the three-phase brushless direct-current motor 50, implementing a position aligning procedure, and driving the three-phase brushless direct-current motor 50 according to the start-up control signal $S_{ST}$, the start mode selection signal $S_{M\_S}$, and the control signal commutation period $T_{PC}$. The floating node selection unit 506 is coupled to the driving unit 504 and the three-phase brushless direct-current motor 50 for selecting a third phase not inducted in the three-phase brushless direct-current motor 50 according to state of the driving unit 504. The back electromotive force detection unit 508 is coupled to the floating node selection unit 506 for detecting back electromotive forces of the three-phase brushless direct-current motor 50. The control unit 510 is coupled to the driving unit 504 and the back electromotive force detection unit 508 for outputting a sensorless mode selection signal $S_{M\_N}$ or a commutation signal $S_{PC}$ to the driving unit 504 according to a detection result of the back electromotive force detection unit 508.

Figure 6:
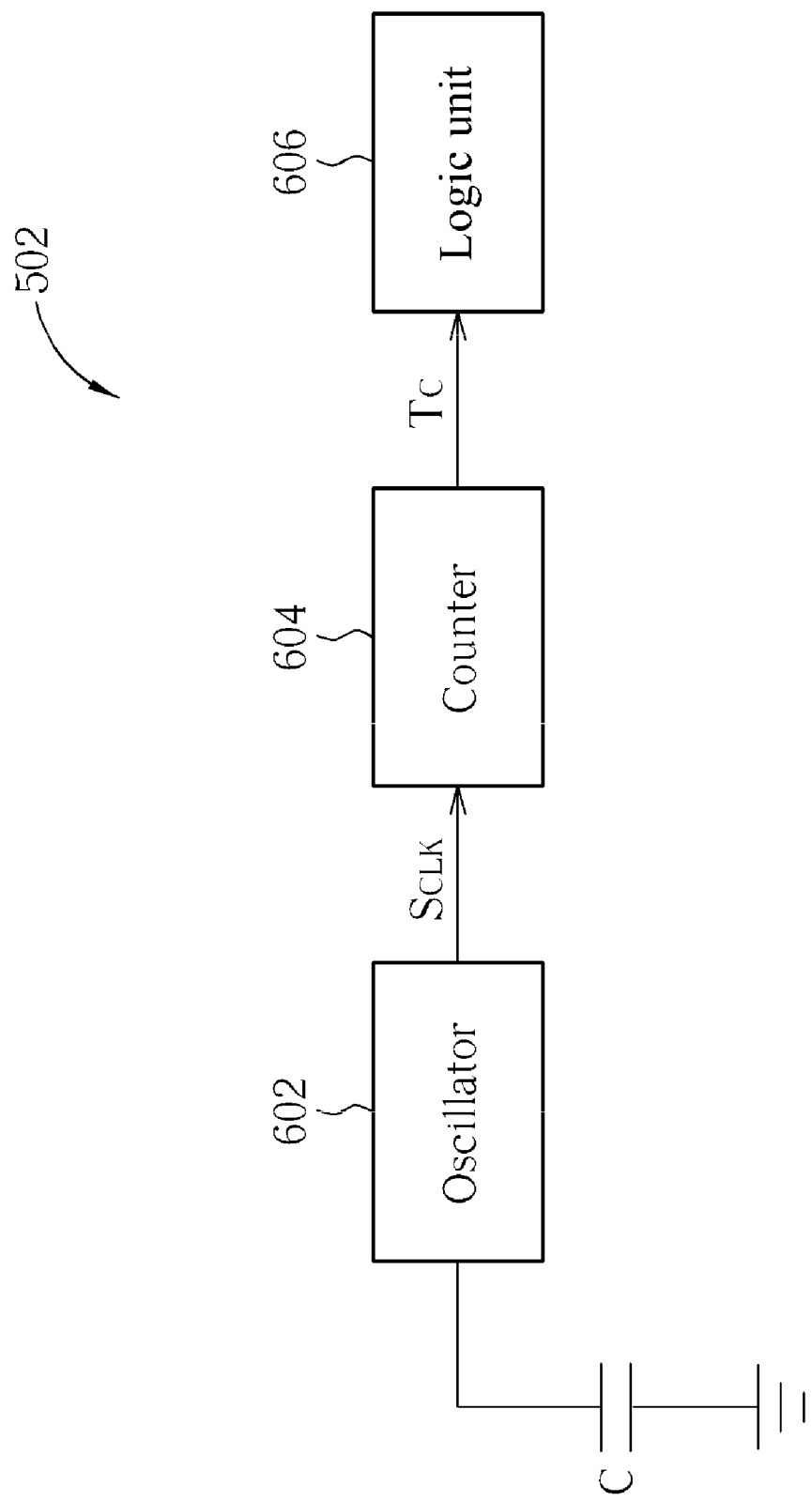
FIG. 6 is a schematic diagram of the starting unit shown in FIG. 5 according to an embodiment of the present invention.
Figure 7:
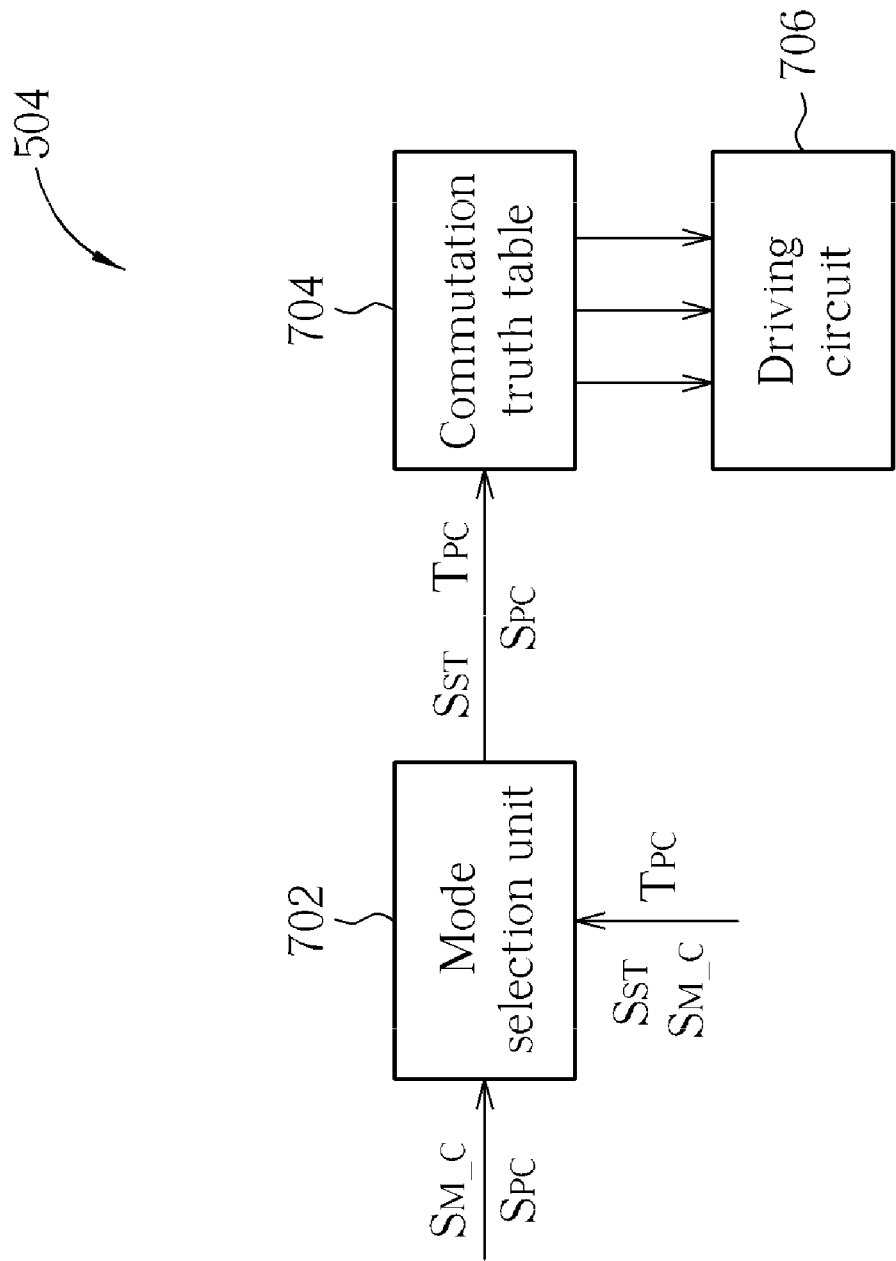
FIG. 7 is a schematic diagram of the driving unit shown in FIG. 5 according to an embodiment of the present invention.

Furthermore, please refer to FIG. 6. FIG. 6 is a schematic diagram of the starting unit 502 shown in FIG. 5 according to an embodiment of the present invention. The starting unit 502 includes an oscillator 602, a counter 604, and a logic unit 606. The oscillator 602 is utilized for generating a clock signal $S_{CLK}$ according to an external capacitor C. The counter 604 is coupled to the oscillator 602 for generating the control signal commutation period $T_{PC}$ according to the clock signal $S_{CLK}$. The counter 604 is coupled to the oscillator 602 for generating the control signal commutation period $T_{PC}$ according to the clock signal $S_{CLK}$. The logic unit 606 is coupled to the counter 604 for generating the start-up control signal $S_{ST}$. Preferably, the clock signal $S_{CLK}$ can be changed by adjusting the external capacitor. In addition, please refer to FIG. 7. FIG. 7 is a schematic diagram of the driving unit 504 shown in FIG. 5 according to an embodiment of the present invention. The driving unit 504 includes a mode selection unit 702, a commutation truth table 704, and a driving circuit 706. The mode selection unit 702 is utilized for switching the operating mode of the three-phase brushless direct-current motor 50 according to the start mode selection signal $S_{M\_S}$ or the sensorless mode selection signal $S_{M\_C}$. The commutation truth table 704 is utilized for providing commutation control logic. The driving circuit 706 is utilized for implementing the position aligning procedure and driving the three-phase brushless direct-current motor 50 according to the start-up control signal $S_{ST}$, the commutation signal $S_{PC}$ and the commutation truth table 704. Preferably, the control unit 510 outputs a commutation signal $S_{PC}$ for a commutation of the three-phase brushless direct-current motor 50 after the driving unit 504 implements a first position aligning procedure according to the start-up control signal $S_{ST}$ and the control signal commutation period $T_{PC}$, and implements a second position aligning procedure. Preferably, the mode selection unit 702 switches the operating mode of the three-phase brushless direct-current motor 50 to the start mode after receiving the start mode selection signal $S_{M\_S}$.

As can be seen, in contrast to the prior art, the present invention implements a sensorless procedure for starting the three-phase brushless direct-current motor 50 without a Hall sensor or a synchronization procedure so as to reduce manufacture cost and volume, simplify circuit design, and not be influenced by the environment temperature, and more importantly, the sensorless starting procedure of the present invention is capable of avoiding an uncertainty factor, such as zero torque, making the rotor accelerate to a specific speed rapidly and reliably, and enhancing probability of starting successfully.

Figure 8:
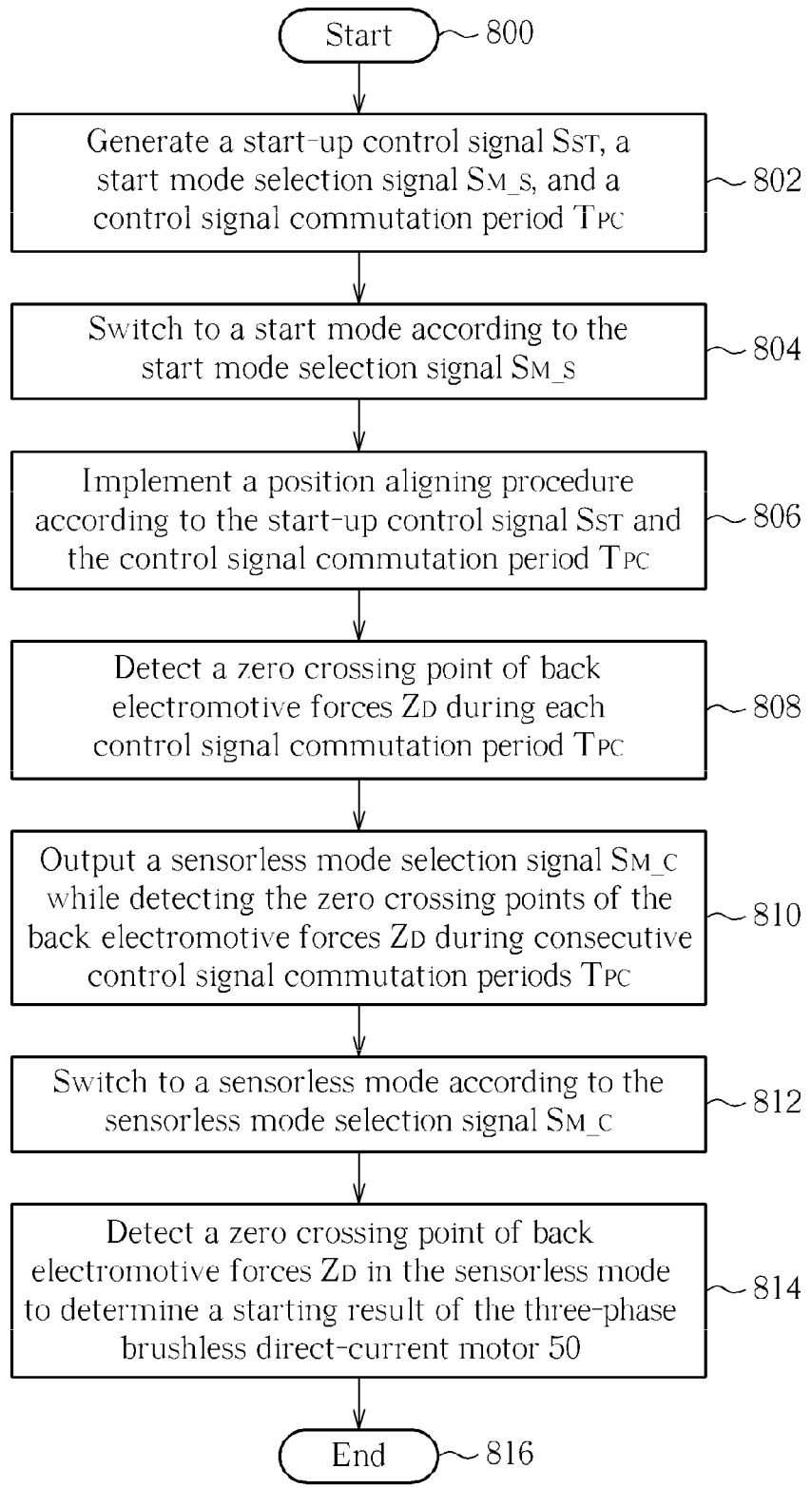
FIG. 8 is a schematic diagram of a procedure according to an embodiment of the present invention.

As to the operating method of the sensorless device 500, please refer to FIG. 8. FIG. 8 is a schematic diagram of a procedure 80 according to an embodiment of the present invention. The procedure 80 comprises the following steps:

Step 800: Start.

Step 802: Generate a start-up control signal $S_{ST}$, a start mode selection signal $S_{M\_S}$, and a control signal commutation period $T_{PC}$.

Step 804: Switch to a start mode according to the start mode selection signal $S_{M\_S}$.

Step 806: Implement a position aligning procedure according to the start-up control signal $S_{ST}$ and the control signal commutation period $T_{PC}$.

Step 808: Detect a zero crossing point of back electromotive forces $Z_D$ during each control signal commutation period $T_{PC}$.

Step 810: Output a sensorless mode selection signal $S_{M\_C}$ while detecting the zero crossing points of the back electromotive forces $Z_D$ during consecutive control signal commutation periods $T_{PC}$.

Step 812: Switch to a sensorless mode according to the sensorless mode selection signal $S_{M\_C}$.

Step 814: Detect a zero crossing point of back electromotive forces $Z_D$ in the sensorless mode to determine a starting result of the three-phase brushless direct-current motor 50.

Step 816: End.

According to the procedure 80, in an embodiment of the present invention, the starting unit 502 generates a start-up control signal $S_{ST}$, a start mode selections signal $S_{M\_S}$, and a control signal commutation period $T_{PC}$. The sensorless device 500 is switched to a start mode according to the start mode selection signal $S_{M\_S}$ by the driving unit 504. The driving unit 504 then implements a position aligning procedure according to the start-up control signal $S_{ST}$ and the control signal commutation period $T_{PC}$. The floating node selection unit 506 selects a third phase not inducted in the three-phase brushless direct-current motor 50 according to state of the driving unit 504 so that the back electromotive force detection unit 508 detects a zero crossing point of back electromotive forces $Z_D$ at the third phase during each control signal commutation period $T_{PC}$. The control unit 510 outputs a sensorless mode selection signal $S_{M\_C}$ to the driving unit 504 while detecting the zero crossing points of the back electromotive forces $Z_D$ during consecutive control signal commutation periods $T_{PC}$. After that, the sensorless device 500 is switched to a sensorless mode according to the sensorless mode selection signal $S_{M\_C}$ by the driving unit 504. In the sensorless mode, the back electromotive force detection unit 508 detects a zero crossing point of back electromotive forces $Z_D$ to determine a starting result of the three-phase brushless direct-current motor 50.

Regarding the abovementioned position aligning procedure, preferably, the control unit 510 outputs a commutation signal $S_{PC}$ for a commutation of the three-phase brushless direct-current motor 50 after the driving unit 504 implements a first position aligning procedure according to the start-up control signal $S_{ST}$ and the control signal commutation period $T_{PC}$. After the driving unit 504 implements a second position aligning procedure, the control unit 510 also outputs a commutation signal $S_{PC}$ for a commutation. The position aligning procedure is able to rotate the rotor into a certain specific position through the torque produced by the magnetic field of the stator and the rotor for predicting the position of the rotor. Therefore, the rotor can be accelerated to a specific speed reliably, enhancing probability of successfully starting the three-phase brushless direct-current motor 50. In addition, the position aligning procedure implements a first position aligning procedure and a second position aligning procedure in order to avoid the rotor and the start-up control signal $S_{ST}$ producing a zero torque. The objective of the first position aligning procedure is to rotate the rotor away from the position having zero torque. The time interval required for the first position aligning procedure is less than that of the second position aligning procedure.

Furthermore, after the position aligning procedure, the back electromotive force detection unit 508 detects a zero crossing point of back electromotive forces $Z_D$ during each control signal commutation period $T_{PC}$ continuously. If no zero crossing point of the back electromotive forces $Z_D$ has been detected in a control signal commutation period, the control unit 510 outputs a commutation signal $S_{PC}$ to the driving unit 504 for a commutation of the three-phase brushless direct-current motor 50. The control unit 510 preferably determines a number of commutations. The control unit 510 can output a sensorless mode selection signal $S_{M\_C}$ to the driving unit 504 when the number of commutations is greater than a threshold value. The sensorless device 500 is switched to a sensorless mode according to the sensorless mode selection signal $S_{M\_C}$ by the driving unit 504. The back electromotive force detection unit 508 then detects a zero crossing point of back electromotive forces $Z_D$ to determine a starting result of the three-phase brushless direct-current motor 50. Other than that, the control unit 510 outputs a commutation signal $S_{PC}$ to the driving unit 504 for a commutation of the three-phase brushless direct-current motor 50 when the number of commutations is less than or equal to a threshold value, and detecting a zero crossing point of back electromotive forces $Z_D$ during the following control signal commutation period. Preferably, the starting result is determined as an accomplished starting procedure when the zero crossing point of the back electromotive forces is detected in the sensorless mode. Otherwise, the starting result is determined as an unaccomplished starting procedure when no zero crossing point of the back electromotive forces is detected in the sensorless mode, and the control unit 510 outputs a commutation signal $S_{PC}$ to the driving unit 504.

Note that the sensorless device 500 is an exemplary embodiment of the present invention, and those skilled in the art can make alternations and modifications accordingly. Preferably, pulse width modulation duty cycles used by the three-phase brushless direct-current motor 50 can have a fixed value and be provided by an external device. In addition, in Step 810, the back electromotive force detection unit 508 need only detect a zero crossing point of back electromotive forces $Z_D$ during each control signal commutation period $T_{PC}$ without a requirement for number of zero crossing point of back electromotive forces $Z_D$ detected during each control signal commutation period $T_{PC}$. The three-phase brushless direct-current motor 50 can be switched to a sensorless mode while detecting the zero crossing points of the back electromotive forces in two consecutive control signal commutation periods.

Figure 9:
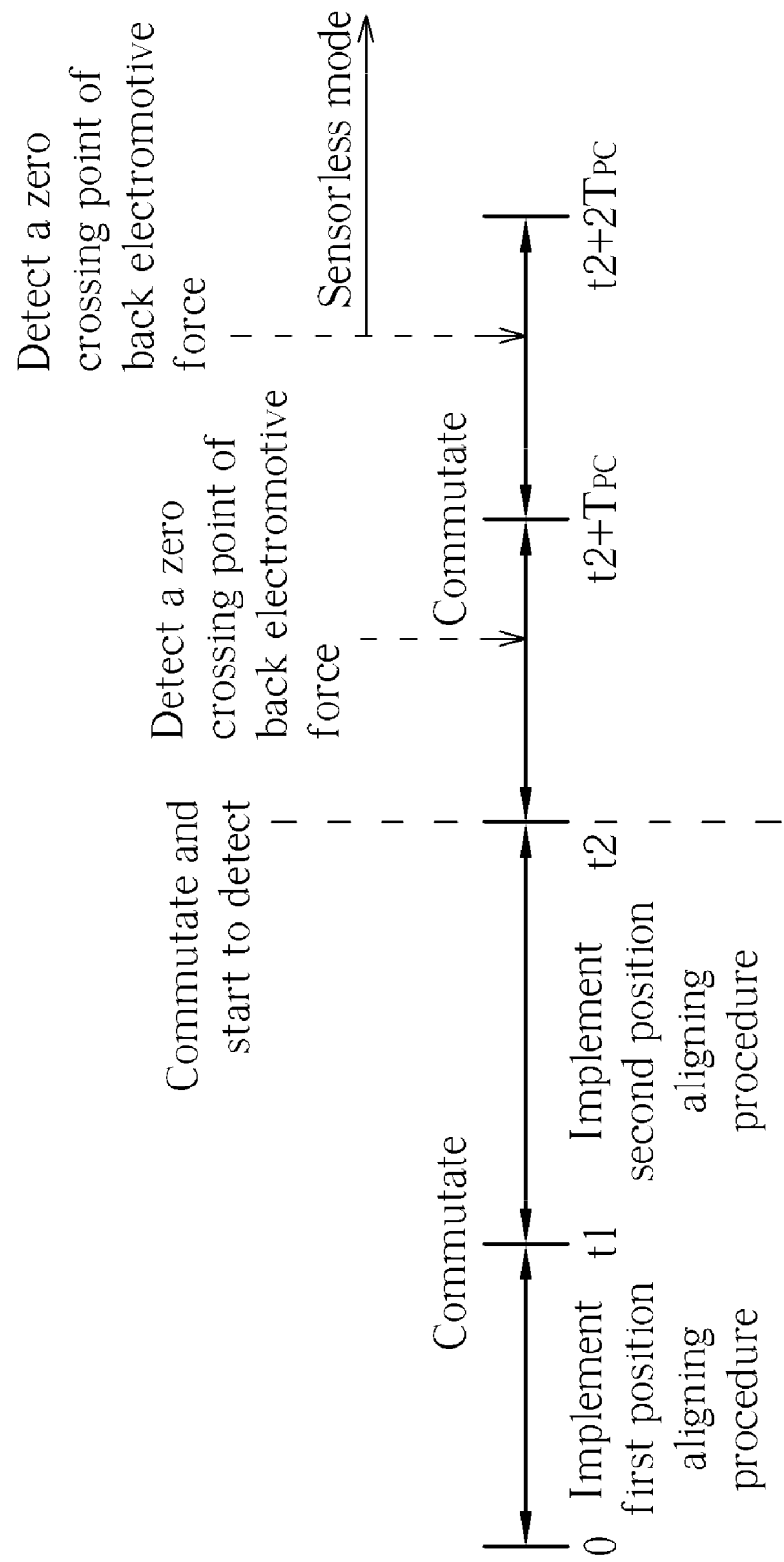
FIG. 9-11 are operating procedure diagrams of the sensorless device according to an embodiment of the present invention.
Figure 10:
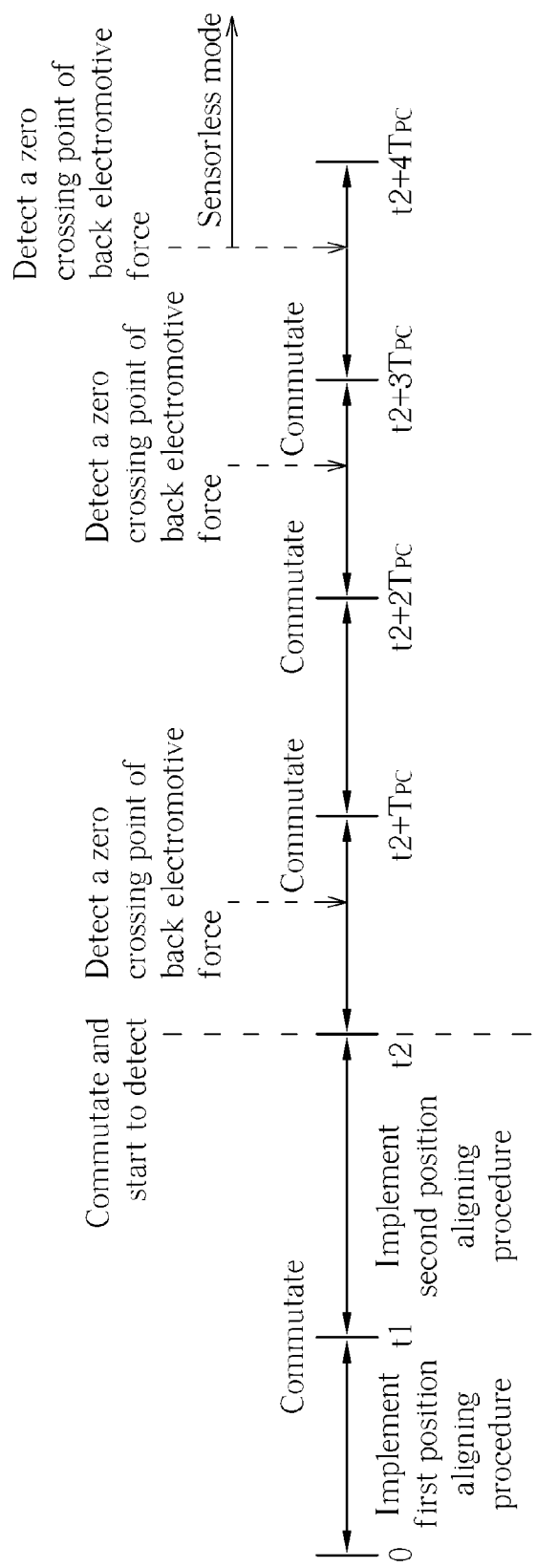
Figure 11:
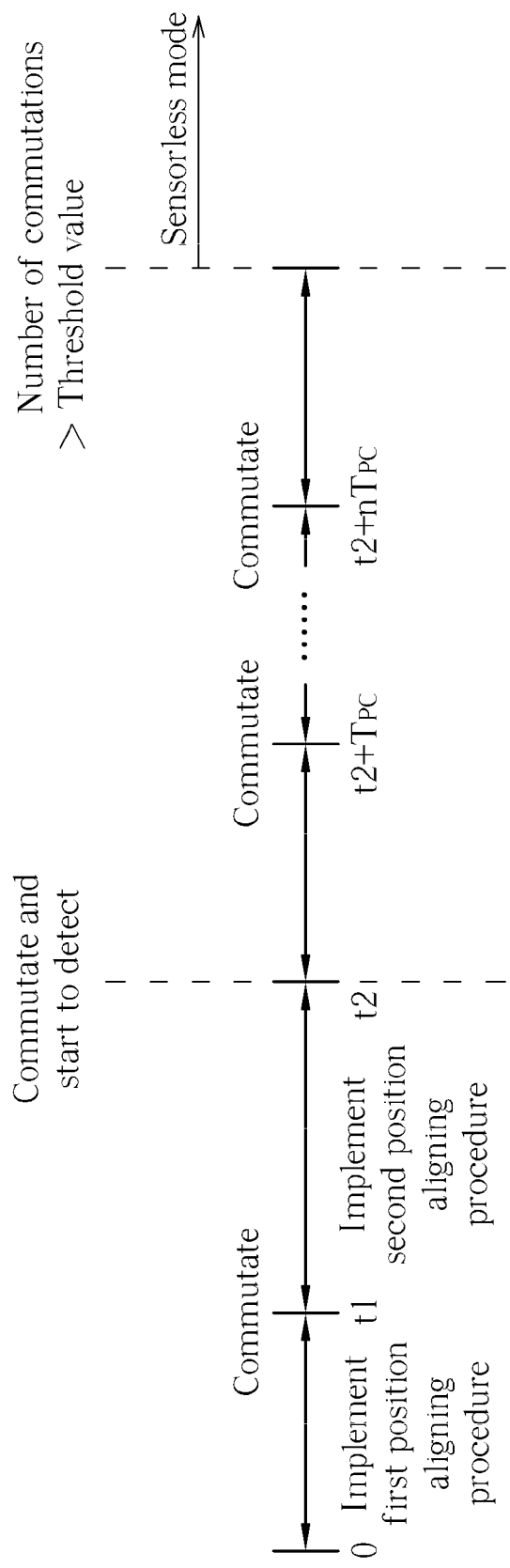

The following further elaborates the embodiment of the present invention. Please refer to FIG. 9-11. FIG. 9-11 are operating procedure diagrams of the sensorless device 500 according to an embodiment of the present invention. The horizontal axis indicates time. Length of the horizontal axis indicates length of the time. As shown in FIG. 9, the back electromotive force detection unit 508 begins to detect zero crossing point of back electromotive forces $Z_D$ from time $t_2$ after the driving unit 504 has implemented the position aligning procedure. While detecting the zero crossing points of the back electromotive forces $Z_D$ in two consecutive control signal commutation periods, the sensorless device 500 will be switched to a sensorless mode. As shown in FIG. 9, if any zero crossing point of back electromotive forces $Z_D$ is detected in the second control signal commutation period $T_{PC}$, the control unit 510 immediately outputs the sensorless mode selection signal $S_{M\_C}$ to the driving unit 504, and the sensorless device 500 can be switched to a sensorless mode. As shown in FIG. 10, the back electromotive force detection unit 508 detects a zero crossing point of back electromotive forces $Z_D$ at one control signal commutation period $T_{PC}$, but detects no zero crossing point of back electromotive forces $Z_D$ at the next control signal commutation period $T_{PC}$. The amounts of detecting the zero crossing point of back electromotive forces $Z_D$ may be reset to zero, i.e. no zero crossing point of back electromotive forces $Z_D$ has been detected. The control unit 510 outputs a commutation signal $S_{PC}$ to the driving unit 504 for a commutation of the three-phase brushless direct-current motor 50. As shown in FIG. 11, if no zero crossing points of the back electromotive forces $Z_D$ are detected in both consecutive control signal commutation periods after the driving unit 504 has implemented the position aligning procedure, and the number of commutations is greater than a threshold value, the sensorless device 500 will be switched to the sensorless mode. In FIG. 9-11, as the sensorless device 500 is switched to the sensorless mode, the back electromotive force detection unit 508 can further detect a zero crossing point of back electromotive forces $Z_D$. Once any zero crossing point of back electromotive forces $Z_D$ is detected after switching, the starting result is determined as an accomplished starting procedure; otherwise, the starting result is determined as an unaccomplished starting procedure, the control unit 510 outputs a commutation signal $S_{PC}$ to the driving unit 504 for a commutation of the three-phase brushless direct-current motor 50, and the sensorless device 500 re-implements a starting procedure.

In summary, compared with the prior art, the present invention implements a sensorless procedure for starting the three-phase brushless direct-current motor 50 without a Hall sensor or a synchronization procedure so as to reduce manufacturing cost and volume, simplify circuit design, and not be influenced by the environment temperature. More importantly, the sensorless starting procedure of the present invention is capable of avoiding an uncertainty factor, such as zero torque, making the rotor accelerate to a specific speed rapidly and reliably, and enhancing probability of starting successfully Those skilled in the art will readily observe that numerous modifications and alterations of the device and method may be made while retaining the teachings of the invention.

What is claimed is:

1. A sensorless method for starting a three-phase brushless direct-current motor, comprising:
   generating a start-up control signal, a start mode selection signal, and a control signal commutation period;
   switching to a start mode according to the start mode selection signal;
   implementing a first position aligning procedure to rotate a rotor of the three-phase brushless direct-current motor into a first position according to the start-up control signal and the control signal commutation period, and outputting a commutation signal for a commutation of the three-phase brushless direct-current motor;
   implementing a second position aligning procedure to rotate the rotor into a second position according to the start-up control signal and the control signal commutation period, and outputting the commutation signal for the commutation of the three-phase brushless direct-current motor, wherein a time interval required for the first position aligning procedure is less than a time interval required for the second position aligning procedure;
   detecting a zero crossing point of back electromotive forces during each control signal commutation period after the first position aligning procedure and the second position aligning procedure;
   outputting a sensorless mode selection signal while detecting the zero crossing points of the back electromotive forces during consecutive control signal commutation periods;
   switching to a sensorless mode according to the sensorless mode selection signal; and
   detecting a zero crossing point of back electromotive forces in the sensorless mode to determine a starting result of the three-phase brushless direct-current motor.

2. The sensorless method of the claim 1, wherein detecting the zero crossing point of the back electromotive force during each control signal commutation period further comprises determining a number of commutations when detecting no zero crossing point of the back electromotive forces during the control signal commutation period.

3. The sensorless method of the claim 2 further comprising:
   outputting a sensorless mode selection signal when the number of commutations is greater than a threshold value;
   switching the start mode to a sensorless mode according to the sensorless mode selection signal; and
   detecting the zero crossing point of back electromotive forces in the sensorless mode so as to determine the starting result of the three-phase brushless direct-current motor.

4. The sensorless method of the claim 2 further comprising outputting a commutation signal for a commutation of the three-phase brushless direct-current motor when the number of commutations is less than or equal to a threshold value, and detecting a zero crossing point of back electromotive forces during the following control signal commutation period.

5. The sensorless method of the claim 1, wherein detecting the zero crossing point of the back electromotive forces in the sensorless mode so as to determine the starting result of the three-phase brushless direct-current motor comprises determining the starting result as an accomplished starting procedure when detecting the zero crossing point of the back electromotive forces in the sensorless mode.

6. The sensorless method of the claim 1, wherein detecting the zero crossing point of the back electromotive forces so as to determine the starting result of the three-phase brushless direct-current motor comprises determining the starting result as an unaccomplished starting procedure when detecting no zero crossing point of the back electromotive forces in the sensorless mode.

7. A sensorless device for starting a three-phase brushless direct-current motor, comprising:
   a starting unit for generating a start-up control signal, a start mode selection signal, and a control signal commutation period;
   a driving unit coupled to the starting unit and the three-phase brushless direct-current motor for switching an operating mode of the three-phase brushless direct-current motor, implementing a position aligning procedure, and driving the three-phase brushless direct-current motor according to the start-up control signal, the start mode selection signal, and the control signal commutation period;
   a floating node selection unit coupled to the driving unit and the three-phase brushless direct-current motor for selecting a third phase not inducted in the three-phase brushless direct-current motor according to state of the driving unit;

a back electromotive force detection unit coupled to the floating node selection unit for detecting back electromotive forces of the three-phase brushless direct-current motor; and a control unit coupled to the driving unit and the back electromotive force detection unit for outputting a sensorless mode selection signal or a commutation signal to the driving unit according to a detection result of the back electromotive force detection unit;

wherein after the driving unit switches to a start mode according to the start mode selection signal, the driving unit implements a first position aligning procedure to rotate a rotor of the three-phase brushless direct-current motor into a first position according to the start-up control signal and the control signal commutation period and the control unit outputs a commutation signal for a commutation of the three-phase brushless direct-current motor, the driving unit further implements a second position aligning procedure to rotate the rotor into a second position and the control unit outputs the commutation signal for another commutation, wherein a time interval required for the first position aligning procedure is less than a time interval required for the second position aligning procedure, the back electromotive force detection unit detects zero crossing points of back electromotive forces during each control signal commutation period after the first position aligning procedure and the second position aligning procedure, and the control unit outputs a sensorless mode selection signal to the driving unit while the detection result indicates that the zero crossing points of the back electromotive forces are detected during the consecutive control signal commutation periods.

8. The sensorless device of claim 7, wherein the starting unit comprises:

an oscillator for generating a clock signal according to an external capacitor;

a counter coupled to the oscillator for generating the control signal commutation period according to the clock signal; and a logic unit coupled to the counter for generating the start-up control signal.

9. The sensorless device of claim 8, wherein the clock signal is changed through adjusting the external capacitor.

10. The sensorless device of claim 7, wherein the driving unit further comprises:

a mode selection unit for switching the operating mode of the three-phase brushless direct-current motor according to the start mode selection signal or the sensorless mode selection signal;

a commutation truth table for providing commutation control logic; and a driving circuit for implementing the position aligning procedure and driving the three-phase brushless direct-current motor according to the start-up control signal, the commutation signal and the commutation truth table.

11. The sensorless device of claim 10, wherein the mode selection unit switches the operating mode of the three-phase brushless direct-current motor to the start mode after receiving the start mode selection signal.

12. The sensorless device of claim 10, wherein the mode selection unit switches the operating mode of the three-phase brushless direct-current motor to the sensorless mode after receiving the sensorless mode selection signal.

13. The sensorless device of claim 12, wherein the back electromotive force detection unit further detects back electromotive forces of the three-phase brushless direct-current motor, and determines a starting procedure is accomplished if a crossing point of the back electromotive forces is detected in the sensorless mode.

14. The sensorless device of claim 12, wherein the back electromotive force detection unit further detects back electromotive forces of the three-phase brushless direct-current motor, and determines a starting procedure is unaccomplished if no crossing point of the back electromotive forces is detected in the sensorless mode.

15. The sensorless device of claim 7, wherein the control unit determines a number of commutations when the detection result indicates that no zero crossing point of the back electromotive forces is detected during the control signal commutation period.

16. The sensorless device of claim 15, wherein the control unit outputs a sensorless mode selection signal to the driving unit when the number of commutations is greater than a threshold value.

17. The sensorless device of claim 15, wherein the control unit outputs a commutation signal to the driving unit when the number of commutations is less than or equal to a threshold value.

* * * * *